US008919224B1

(12) United States Patent
Bennett et al.

(10) Patent No.: US 8,919,224 B1
(45) Date of Patent: Dec. 30, 2014

(54) TRANSMISSION WITH INTEGRATED DRUM GEAR BRAKE

(75) Inventors: Michael L. Bennett, Sullivan, IL (US); Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 216 days.

(21) Appl. No.: 13/490,727

(22) Filed: Jun. 7, 2012

Related U.S. Application Data

(60) Provisional application No. 61/494,167, filed on Jun. 7, 2011.

(51) Int. Cl.
*F16H 47/00* (2006.01)
*F16D 51/00* (2006.01)

(52) U.S. Cl.
USPC .......................................... 74/730.1; 188/78

(58) Field of Classification Search
CPC ......... F16D 65/22; F16D 51/18; F16D 51/20; F16D 65/10
USPC .......................................... 74/730.1; 188/78
See application file for complete search history.

(56) References Cited

U.S. PATENT DOCUMENTS

| 673,926 | A |   | 5/1901 | Satter |   |
|---|---|---|---|---|---|
| 684,833 | A |   | 10/1901 | Lemp |   |
| 1,098,576 | A |   | 6/1914 | Huff |   |
| 1,873,458 | A |   | 8/1932 | Murnane |   |
| 2,580,381 | A |   | 1/1952 | Banker |   |
| 3,034,601 | A | * | 5/1962 | Felburn | 188/332 |
| 3,096,856 | A | * | 7/1963 | Burnett | 188/332 |
| 4,134,276 | A |   | 1/1979 | Lampard |   |
| 4,514,145 | A |   | 4/1985 | Wood |   |
| 4,613,282 | A |   | 9/1986 | Wood |   |
| 5,255,763 | A | * | 10/1993 | Redgrave et al. | 188/330 |
| 5,443,135 | A | * | 8/1995 | Redgrave | 188/250 F |
| 6,019,385 | A |   | 2/2000 | Kelley et al. |   |
| 7,044,275 | B2 | * | 5/2006 | Maehara | 188/329 |
| 7,070,025 | B2 | * | 7/2006 | Maehara | 188/79.56 |
| 7,134,276 | B1 |   | 11/2006 | Langenfeld et al. |   |
| 7,543,692 | B2 | * | 6/2009 | Clark et al. | 188/325 |
| 7,926,624 | B1 |   | 4/2011 | Taylor |   |
| 8,371,068 | B1 | * | 2/2013 | Kunz | 49/181 |

* cited by examiner

*Primary Examiner* — Ha D Ho
(74) *Attorney, Agent, or Firm* — Neal, Gerber & Eisenberg LLP

(57) ABSTRACT

A transmission having an integrated gear and brake mechanism is disposed in a housing, the transmission having a variable drive mechanism, gear train, and an output axle engaged to the gear train. The output axle is driven by a final drive gear having an integrated drum brake within its circumference.

14 Claims, 5 Drawing Sheets

TRANSMISSION WITH INTEGRATED DRUM GEAR BRAKE

CROSS-REFERENCE TO RELATED APPLICATION

This application claims the benefit of Provisional Application Ser. No. 61/494,167, filed Jun. 7, 2011, the disclosure of which is incorporated herein by reference.

BACKGROUND OF THE INVENTION

This application relates to a transmission having an integrated gear and brake mechanism that is useful in the drive systems of vehicles or utility transports.

SUMMARY OF THE INVENTION

A transmission having an integrated gear and brake mechanism, e.g. the transaxle of a vehicle, is disclosed herein. The integrated gear and brake mechanism provides a compact assembly with improved braking capacity, wherein the brake can be included in a common housing with the transmission. Typically, a small utility vehicle equipped with a hydrostatic transmission or transaxle, such as a lawn tractor, relies on the inherent braking associated with the vehicle's engine and transmission combination when the transmission is returned to neutral. This braking effect requires drive belt integrity between the engine and transmission, a sufficient volume of hydraulic fluid in the hydraulic circuit between the transmission's pump and motor, and gear train integrity between the hydraulic motor and axle. On flat ground, these vehicles will be brought to a stop within a few feet without application of a dynamic brake. Consequently, many such vehicles are equipped with only a static parking brake designed for engagement with the motor shaft or a shaft disposed between the motor shaft and output axle. In other instances, a parking brake may directly engage the cylinder block of an axial piston hydraulic motor.

On sufficient inclines, however, gravity may overcome the vehicle's inherent braking effect permitting the vehicle to slowly move downhill when in neutral. Whether in neutral or not, failure of a drive train component, can result in the vehicle freewheeling down an incline. There is a need for a compact braking mechanism associated with the output axle. When used in a hydrostatic transaxle, the brake of the present invention is effective even if there is a loss of drive force applied to the axle caused by, for example, breakage of gear teeth in the drive train, loss of fluid integrity of the hydraulic circuit, or breakage of an input drive belt. The mechanical brake mechanism disclosed herein acts upon and within the final drive gear engaged to the output axle. The present invention has application to vehicles such as lawn mowers and tractors, garden tractors, snow throwers, and other applications where a compact drive unit is desired.

A better understanding of the objects, advantages, features, properties and relationships of the invention will be obtained from the following detailed description and accompanying drawings.

DETAILED DESCRIPTION OF THE DRAWINGS

Figure 1:
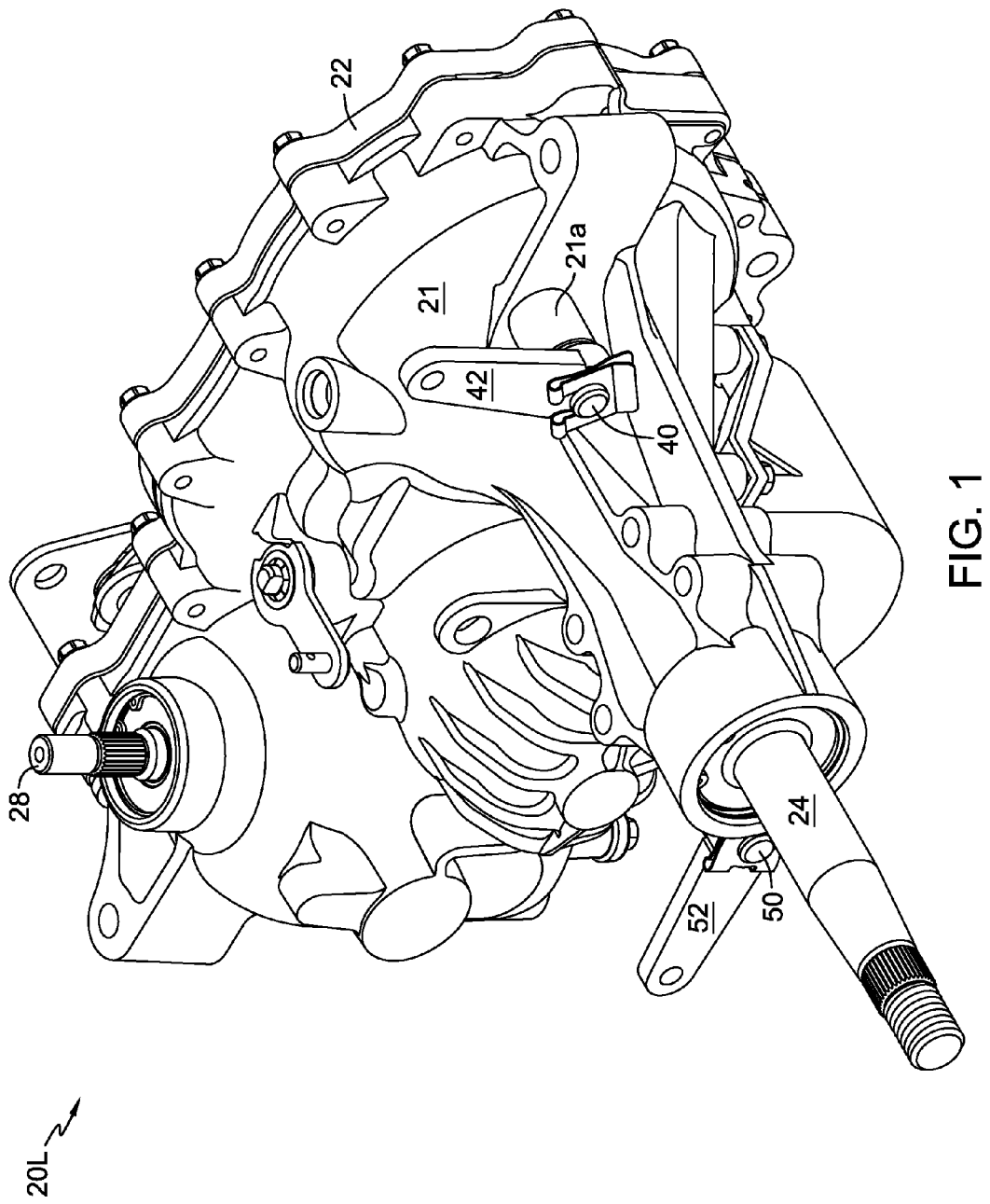
FIG. 1 is a perspective view of a transaxle in accordance with the principles of the invention with the main housing in place.
Figure 2:
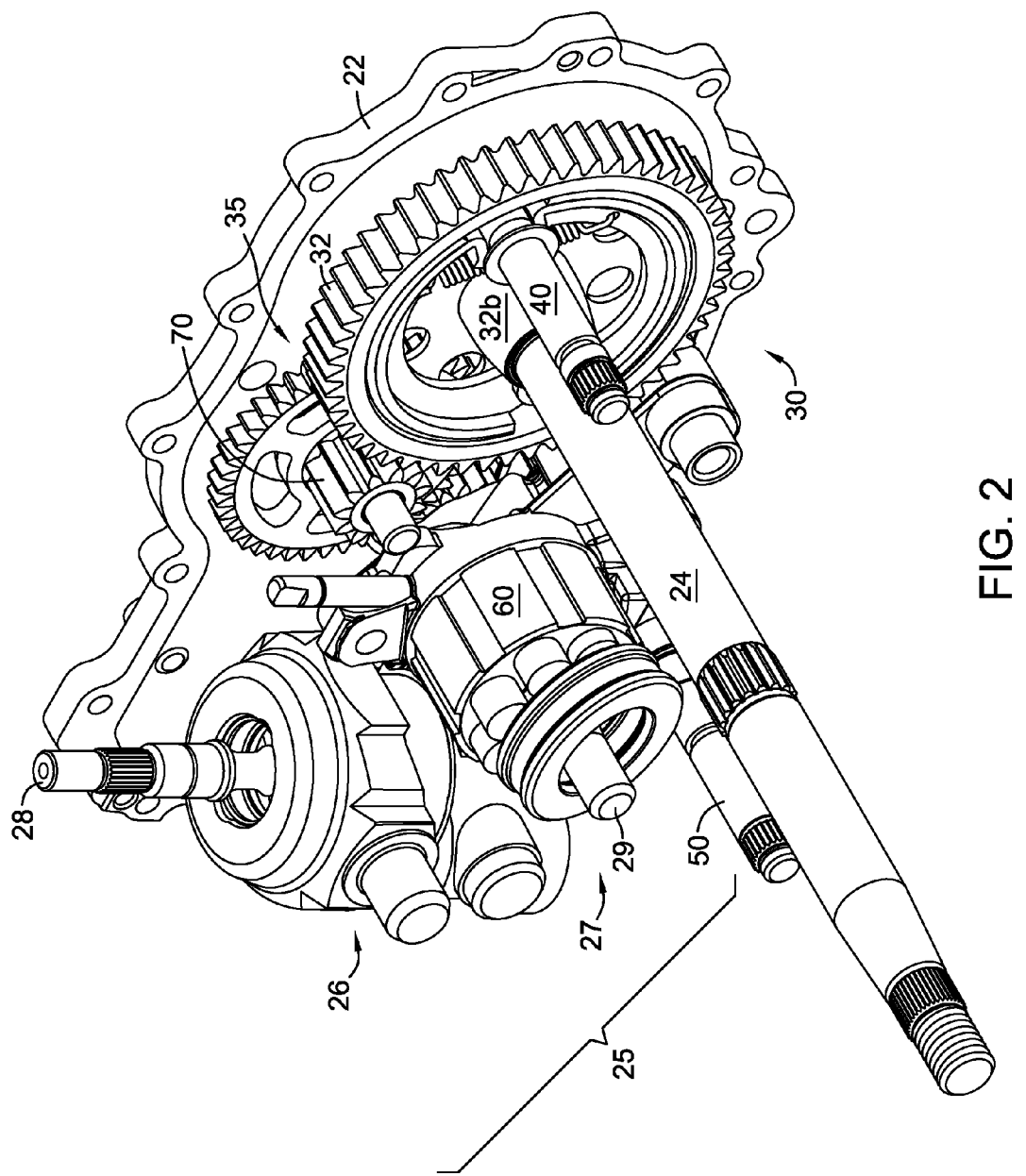
FIG. 2 is a perspective view of the transaxle shown in FIG. 1 with the main housing removed.

FIGS. 1 and 2 depict an exemplary transaxle 20L in accordance with the principles of the invention. The 'L' designates the left-side drive unit of a vehicle 90 such as that shown in FIG. 5. The variable drive mechanism for this transaxle can be an integrated hydrostatic transmission 25 having a variable displacement hydraulic pump 26 and a fixed displacement hydraulic motor 27, the integrated hydrostatic transmission 25 located in a single housing, such as is shown in commonly owned U.S. Pat. Nos. 7,134,276 and 7,926,624, the disclosures of which are incorporated herein by reference. It will be understood that other variable drive mechanisms may be used within the principles of this invention, e.g. an independent hydrostatic transmission mounted to a drive axle mechanism. Similarly, the integrated gear and brake mechanism disclosed herein may be used with a gear drive transmission.

Main housing 21 is fastened to side housing 22 to form a sump in which the integrated hydrostatic transmission 25, gear train 35, and integrated gear and brake mechanism 30 are disposed. As will be understood from the aforementioned patents, hydrostatic transmission 25 transfers rotational force received from a prime mover, such as prime mover 91 in FIG. 5, via input shaft 28 to motor shaft 29. This force is then transferred through a gear train 35, comprising gears 70 and 32, among others, to gear hub 32b and axle 24. One end of axle 24 extends from main housing 21 to drive wheel 93 of vehicle 90 or some other output.

Figure 3:
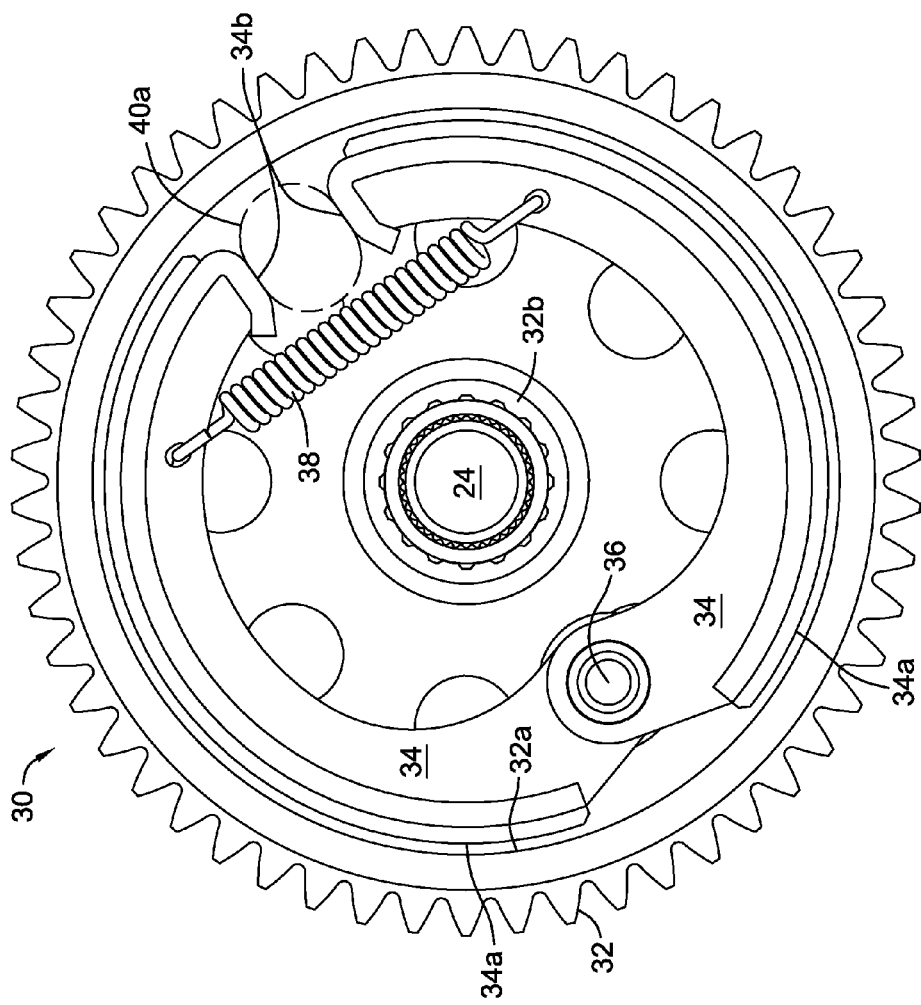
FIG. 3 is an elevational view of the integrated gear and brake mechanism shown in FIG. 2.
Figure 4:
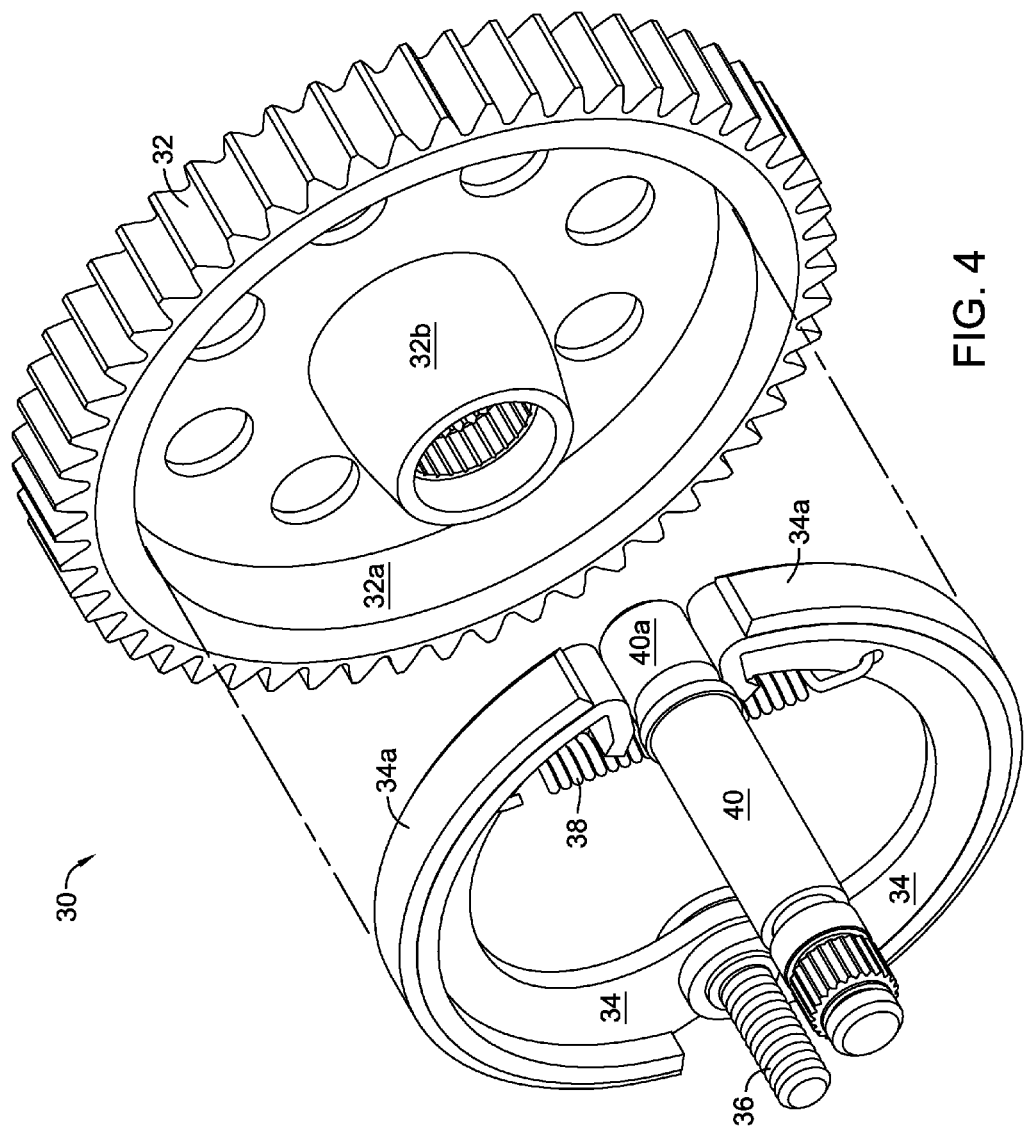
FIG. 4 is a perspective view of the integrated gear and brake mechanism shown in FIG. 2, partially exploded.

The internal workings of integrated gear and brake mechanism 30 can be seen in FIGS. 2-4. One end of brake actuation shaft 40 projects from main housing 21 through a support structure 21a formed on main housing 21, and brake actuation shaft 40 has an axis of rotation that is parallel to the axis of rotation of axle 24. Brake actuation lever 42 is fixed to the external end of brake actuation shaft 40 such that rotation of brake actuation lever 42 causes rotation of brake actuation shaft 40 and brake cam 40a, which may be formed integrally as a portion of brake actuation shaft 40.

As shown in FIGS. 3 and 4, drum gear 32, the final drive gear affixed to axle 24, includes a drum braking surface 32a formed on an inner circumference opposite its external gear form. Brake shoes 34 have brake pads 34a which are brought into contact with drum braking surface 32a when the brake is actuated. Brake cam 40a engages a contact surface 34b on each brake shoe 34. A brake spring 38 connected to the brake shoes 34 maintains the necessary contact between brake cam 40a and contact surfaces 34b to permit brake actuation and properly positions each brake shoe 34 when brake mechanism 30 is in a disengaged state. The ends of each brake shoe 34 opposite contact surfaces 34b are secured by a single brake shoe fastener 36, about which each brake shoe 34 may pivot. Brake shoe fastener 36 passes through an opening in the end of each brake shoe 34 and engages an interior feature (not shown) of main housing 21, thereby pivotally anchoring the brake shoes 34.

The brake portion of the integrated gear and brake mechanism 30 is shown in FIG. 3 in a disengaged state. When cam 40a rotates via rotation of brake actuation lever 42, contact surfaces 34b are forced apart against the bias force of brake spring 38. The resulting motion of brake shoes 34, which is radial with respect to the rotational axis of axle 24, causes brake pads 34a to contact drum braking surface 32a. This contact causes friction which slows and/or stops the rotation of drum gear 32. Because axle 24 is fixed to drum gear hub 32b, the rotation of axle 24 is correspondingly slowed or stopped. Brake mechanism 30 may serve as both a dynamic brake and a parking brake if appropriate control linkages are employed.

An optional parking brake may be added to transaxle 20L as depicted in FIGS. 1 and 2. An end of parking brake actuation shaft 50 projects from main housing 21. Parking brake actuation lever 52 is fixed to the projecting end of parking brake actuation shaft 50 such that rotation of the parking brake actuation lever 52 causes rotation of brake actuation shaft 50, and thus control of the parking brake. FIG. 2 shows parking brake actuation shaft 50 in proximity with slotted motor cylinder block 60, the rotation of which is braked when rotation of parking brake actuation lever 52 actuates the parking brake. Parking brake actuation shaft 50 may have an axis of rotation that is parallel to the axes of rotation of axle 24, motor shaft 29 and brake actuation shaft 40 for simplicity of construction and use. Motor shaft 29 is engaged directly to motor cylinder block 60 to rotate therewith. The details of the block brake mechanism depicted herein are fully described in U.S. Pat. No. 7,926,624 and will not be further described herein. Because drum gear 32 is drivingly connected through gear train 35 to motor shaft 29, and consequently cylinder block 60, braking of motor cylinder block 60 accomplishes braking of axle 24. A transaxle in accordance with the principles of the invention can thus be equipped with a separate parking brake.

Figure 5:
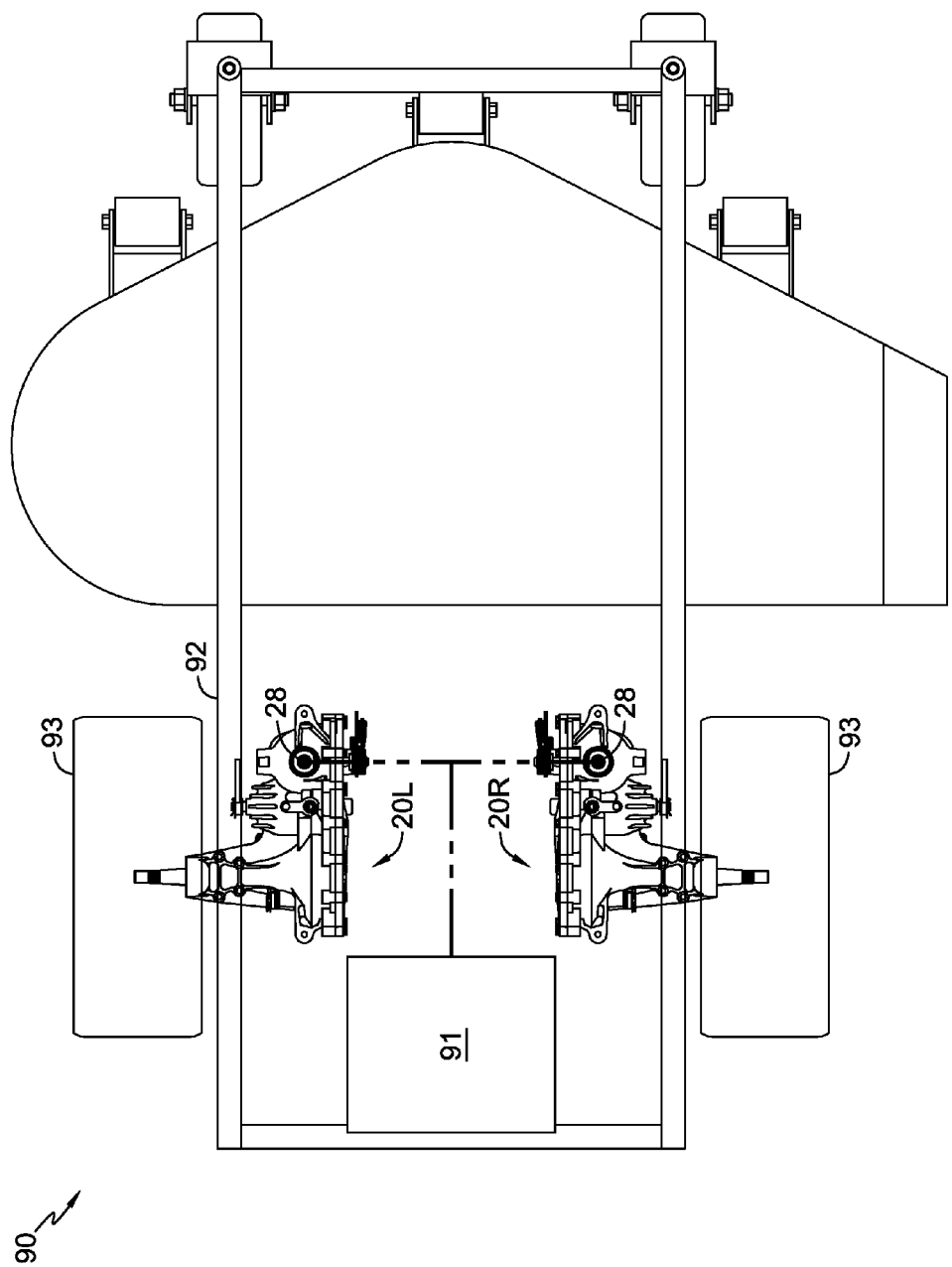
FIG. 5 is a top plan view of a zero-turn vehicle incorporating two transaxles of the present invention.

The transaxle 20L depicted herein is preferably used in tandem in connection with a zero turn vehicle. FIG. 5 depicts vehicle 90 having transaxles 20L and 20R. FIG. 1 depicts the external view of the transaxle 20L, with the understanding that transaxle 20R is essentially identical in construction and is therefore depicted as a mirror image of the transaxle 20L. Transaxles 20L and 20R are mounted to frame 92 by fasteners (not shown). Prime mover 91 provides power through a power transfer means such as a belt and pulley assembly (not shown) to transaxles 20L and 20R, each of which independently drives a wheel 93. Each pump input shaft 28 is splined to accept a pulley (not shown) that is driven by a belt (not shown) running between pump input shaft 28 and the output shaft (not shown) of prime mover 91. Prime mover 91 may be an internal combustion engine, electric motor, or other known motive assembly. It will be understood that the features of the transaxle described herein can also be applied to a single transaxle unit having one or two axles for use in other powered machinery or non-zero-turn vehicle applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus, comprising:
   a variable drive mechanism disposed in a housing and comprising an output shaft;
   a gear train disposed in the housing and driven by the output shaft, the gear train comprising at least a first transmission gear and a second transmission gear;
   an axle disposed in the housing and having a first axis of rotation, wherein at least one end of the axle extends outside the housing and the axle is engaged to and driven by the second transmission gear;
   a brake mechanism disposed in the housing and comprising a brake surface formed on an internal circumference of the second transmission gear, a first brake shoe and a second brake shoe, each brake shoe having a brake pad in proximity to the brake surface of the second transmission gear, and a cam engaged to a first end of the first brake shoe and a first end of the second brake shoe; and
   a brake actuation shaft connected to the cam and having a second axis of rotation, whereby rotation of the brake actuation shaft causes radial motion of both brake shoes toward the brake surface.

2. The drive apparatus of claim 1, wherein a second end of the first brake shoe and a second end of the second brake shoe, each opposite the respective first ends, are connected by a single fastener.

3. The drive apparatus of claim 2, wherein the second end of the first brake shoe and the second end of the second brake shoe each comprise an opening through which the single fastener passes, and wherein the first brake shoe and the second brake shoe pivot about the single fastener.

4. The drive apparatus of claim 2, wherein the single fastener engages the first brake shoe and the second brake shoe to the housing.

5. The drive apparatus of claim 1, further comprising a spring engaged to each of the first and second brake shoes, wherein the spring is biased to maintain the first end of each of the first and second brake shoes away from the brake surface.

6. The drive apparatus of claim 1, wherein the first axis of rotation is parallel to the second axis of rotation.

7. The drive apparatus of claim 6, wherein the second axis of rotation of the brake actuation shaft is positioned internal to the circumference of the brake surface of the second transmission gear.

8. The drive apparatus of claim 1, wherein the variable drive mechanism comprises a hydraulic motor driven by a hydraulic pump.

9. The drive apparatus of claim 8, wherein hydraulic motor comprises a cylinder block driving a motor shaft, and the motor shaft has a third axis of rotation that is parallel to the first and second axes of rotation.

10. The drive apparatus of claim 8, further comprising a parking brake mechanism disposed in the housing for providing an additional braking force to the variable drive mechanism.

11. The drive apparatus of claim 10, wherein the parking brake mechanism comprises a parking brake actuation shaft that has a fourth axis of rotation that is parallel to the first and second axes of rotation.

12. The drive apparatus of claim 1, wherein the cam is integrally formed as part of the brake actuation shaft.

13. A drive apparatus for a vehicle having a pair of driven wheels, the drive apparatus comprising:
   a first housing disposed on one side of the vehicle adjacent a first of the pair of driven wheels and a second housing disposed on a second side of the vehicle adjacent a second of the pair of driven wheels;
   a first variable drive mechanism disposed in the first housing and comprising a first output shaft and a second variable drive mechanism disposed in the second housing and comprising a second output shaft;
   a first gear train disposed in the first housing and driven by the first output shaft, the first gear train comprising a first plurality of transmission gears;

a second gear train disposed in the second housing and driven by the second output shaft, the second gear train comprising a second plurality of transmission gears;

a first axle disposed in the first housing and driven by the first plurality of transmission gears, wherein at least one end of the first axle extends outside the first housing to drive the first of the pair of driven wheels;

a second axle disposed in the second housing and driven by the second plurality of transmission gears, wherein at least one end of the second axle extends outside the second housing to drive the second of the pair of driven wheels;

a first brake mechanism disposed in the first housing and comprising a first brake surface formed on an internal circumference of one of the first plurality of transmission gears and a first pair of brake shoes, each of the first pair of brake shoes having a first brake pad in proximity to the first brake surface; and a second brake mechanism disposed in the second housing and comprising a second brake surface formed on an internal circumference of one of the second plurality of transmission gears and a second pair of brake shoes, each of the second pair of brake shoes having a second brake pad in proximity to the second brake surface;

a first brake actuation shaft disposed at least partially in the first housing and a first cam engaged to one end of both of the first pair of brake shoes, whereby the first brake actuation shaft engages the first cam to cause a radial motion of both of the first pair of brake shoes toward the first brake surface; and a second brake actuation shaft disposed at least partially in the second housing and a second cam engaged to one end of both of the second pair of brake shoes, whereby the second brake actuation shaft engages the second cam to cause a radial motion of both of the second pair of brake shoes upon rotation of the second brake actuation shaft.

14. The drive apparatus of claim 13, wherein the first variable drive mechanism comprises a first hydraulic motor driven by a first hydraulic pump, and the second variable drive mechanism comprises a second hydraulic motor driven by a second hydraulic pump, and the vehicle comprises a prime mover providing power to both the first hydraulic pump and the second hydraulic pump, the drive apparatus further comprising a first spring biasing the first pair of brake shoes away from the first brake surface and a second spring biasing the second pair of brake shoes away from the second brake surface.

* * * * *